Feb. 19, 1952 H. RINIA 2,586,091
MODULATED RADIO FREQUENCY PULSE RECEIVER
Original Filed April 18, 1946
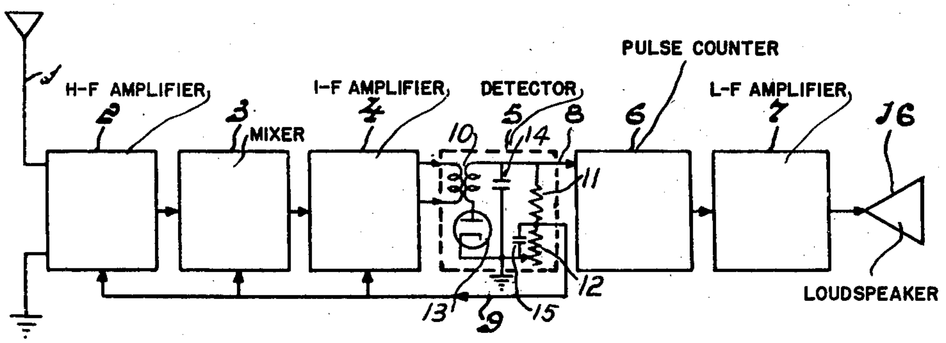
INVENTOR
Harre Rinia
BY
[signature]
ATTORNEY.

Patented Feb. 19, 1952 2,586,091

UNITED STATES PATENT OFFICE 2,586,091

MODULATED RADIO FREQUENCY PULSE RECEIVER

Herre Rinia, Eindhoven, Netherlands, assignor, by mesne assignments, to Hartford National Bank and Trust Company, Hartford, Conn., as trustee Original application April 18, 1946, Serial No. 662,967. Divided and this application December 8, 1947, Serial No. 790,323. In the Netherlands December 13, 1941

Section 1, Public Law 690, August 8, 1946
Patent expires December 13, 1961

5 Claims. (Cl. 250—20)

The invention relates to an arrangement for receiving signals transmitted by means of pulses of constant amplitude.

This application constitutes a division of copending application Serial Number 662,967 filed April 18, 1946, now abandoned.

In such devices it is known to utilize a threshold device for the purpose of improving the signal-to-noise ratio so that only those portions of the incoming pulses of which the amplitudes exceed the threshold value determined by the said threshold device contribute to the reproduction of the signal.

It has been found that the use of such a threshold device may, under certain conditions, entail distortion of the signal transmitted.

According to the invention this distortion is restricted by the use of means for maintaining constancy of the ratio between the threshold value and the amplitude of the incoming pulses, said means being controlled in accordance with the amplitude of the incoming pulses.

The ratio between the threshold value and the amplitude of the incoming pulses may be maintained constant by causing the threshold value to be varied automatically in accordance with the amplitude of the incoming pulses. A further possibility yielding the same effect is to cause the amplification of an amplifier preceding the threshold device to be varied in accordance with the amplitude of the incoming pulses in such manner that the pulses supplied to the threshold device exhibit an amplitude which is substantially constant. If desired, both steps may be taken in combination.

The occurrence of the above-mentioned distortion may be appreciated as follows. The pulses to be transmitted are distorted during transmission (for example in a transmitter and receiver) in such manner that the bottom of the pulses is widened and the top narrowed. When fading occurs, the shape of the transmitted pulses at the receiving end does not vary substantially from the shape of the pulses as transmitted, whereas the amplitude may vary to a great extent. Consequently, the use of a constant threshold device has the effect that the duration measured at the bottom of the pulses passed by the threshold device varies in the case of fading, which implies distortion of the signal transmitted. True the use of a threshold device ensures a material reduction of noise, but on the other hand fading-dependent distortion of the signal to be transmitted ensues. The use of the invention permits of restricting or suppressing the described fading-dependent distortion.

In order that the invention may be clearly understood and readily carried into effect, it will now be described more fully by reference to the accompanying drawing.

The figure shows a receiver for the reception of signals transmitted by means of pulse-frequency modulation.

In the receiver shown, the oscillations received by the antenna 1, after being amplified in a high-frequency amplifier 2, are converted in a mixing stage 3, into intermediate-frequency-oscillations having a frequency of, for example 2 megacycles per second. These oscillations are amplified in an intermediate frequency amplifier 4 and are rectified in stage 5.

The rectifier as shown by way of example is such that it also serves as a threshold device having a value which is varied automatically in accordance with the amplitude of the incoming pulses so that the ratio between the threshold value and the amplitude of the incoming pulses is substantially constant, which ratio is in addition manually adjustable. For this purpose the series-connected secondary of an input transformer 10 and two resistors 11 and 12 are connected across the rectifying diode 13. The value of resistor 12 is adjustable by hand. A capacitor 14 is connected parallel to resistors 11 and 12 and a capacitor 15 parallel to resistor 12. In certain cases the capacity to ground of the circuit elements may already suffice to fulfill the function of capacitor 14. From the junction between resistor 11 and capacitor 14 a conductor 8 leads to the subsequent stage of the circuit and from resistors 11 and 12 a conductor 9 returns to the preceding stages for automatic gain control, since the time constants are chosen to be such that the voltage variations at the upper end of resistor 11 follow the outline of the rectified pulses, but at the lower end of this resistor only slow voltage variations remain so that even the lowest modulation frequencies are not followed.

Owing to the voltage drop across resistor 12 the diode 13 acquires a threshold value which is dependent on the amplitude of the incoming pulses so that the ratio between the threshold value and the amplitude of the incoming pulses is substantially independent, this ratio being dependent on the ratio $R_{11}:R_{12}$, where $R_{11}$ is the resistance value of resistor 11 and $R_{12}$ is that for resistor 12. Since the resistance of resistor 12 is adjustable, this ratio can also be varied. Once this ratio is adjusted manually to a determined value, it remains independent within wide limits of the amplitude of the pulses.

The pulses obtained after detection control a device 6, which at first converts the incoming pulses into renewed pulses having a shape and amplitude independent of the incoming pulses, and which subsequently determines the number of pulses per time-unit.

When the device 6, regardless of the operation, is only operative when the amplitude of the incoming pulses has reached a certain minimum value, this device itself can also serve as a variable threshold device for the rectified pulses, in which case its output yields the desired transmitted signal which, after having been amplified by a low-frequency amplifier 7, is supplied to a consumer device, for example a loudspeaker 16.

I claim:

1. Apparatus adapted to receive transmitted radio-frequency pulses of constant width and amplitude whose periodicity is modulated in accordance with an intelligence signal, said apparatus comprising a detector to demodulate the incoming radio-frequency pulses, said detector including a threshold network rendering the detector responsive solely to the upper portion of the input pulses exceeding a limiting value equal to a predetermined fraction of the peak amplitude of said incoming pulses, said network having means varying said limiting value automatically in accordance with the peak amplitude of said incoming pulses whereby the ratio of the limiting value to the peak amplitude is maintained substantially constant, and a pulse counting device coupled to the output of said detector to produce an output voltage varying in amplitude in accordance with the periodicity of the demodulated pulses applied thereto.

2. Apparatus adapted to receive transmitted radio-frequency pulses of constant width and amplitude whose periodicity is modulated in accordance with an intelligence signal, said apparatus comprising a detector to demodulate the incoming radio-frequency pulses, said detector including a diode rectifier, an input inductance connected in series with said rectifier, an output resistor, a threshold network constituted by a capacitance connected in parallel with a resistance, said network being connected in series with said resistor across said serially-connected rectifier and inductance, said network having a time constant at which a limiting bias is developed thereacross and is applied to said rectifier, said limiting bias varying in proportion to the peak value of the incoming radio-frequency pulses applied to said input inductance whereby the detector demodulates only the upper portion of the applied pulses, and a pulse counting device coupled to said output resistor to produce an output voltage varying in amplitude in accordance with the periodicity of the demodulated pulses applied thereto.

3. An arrangement, as set forth in claim 2, wherein the resistance in said threshold network is variable to enable adjustment of said limiting voltage.

4. Apparatus adapted to receive transmitted radio-frequency pulses of constant width and amplitude whose periodicity is modulated in accordance with an intelligence signal, said apparatus comprising a mixer circuit for combining the incoming radio-frequency pulses with local oscillations to produce intermediate-frequency pulses, a detector coupled to said mixer circuit to demodulate said pulses, said detector including a diode rectifier, an input inductance coupled to said mixer circuit and connected in series with said rectifier, an output resistor, a threshold network constituted by a capacitance connected in parallel with a resistance, said network being connected in series with said resistor across the serially-connected rectifier and inductance, said network having a time constant at which a limiting bias is developed thereacross and applied to said rectifier, said limiting bias varying in proportion to the peak value of the intermediate-frequency pulses applied to said input inductance, a pulse counting device coupled to said output resistor to produce an output voltage varying in amplitude in accordance with the periodicity of the demodulated pulses applied thereto, and means to apply the voltage developed across said network as an automatic-gain-control voltage to said mixer circuit.

5. Apparatus adapted to receive transmitted radio-frequency pulses of constant width and amplitude whose periodicity is modulated in accordance with an intelligence signal, said apparatus comprising a radio frequency amplifier for said incoming pulses, a mixer circuit for combining the incoming radio-frequency pulses in the output of said amplifier with local oscillations to produce intermediate-frequency pulses, an intermediate-frequency amplifier coupled to the output of said mixer circuit, a detector coupled to the output of said intermediate frequency amplifier to demodulate said pulses, said detector including a diode rectifier, an input inductance coupled to said intermediate-frequency amplifier and connected in series with said rectifier, an output resistor, a threshold network constituted by a capacitance connected in parallel with a variable resistance, said network being connected in series with said resistor across said serially-connected rectifier and inductance, said network having a time constant at which a limiting bias is developed thereacross and applied to said rectifier, said limiting bias varying in proportion to the peak value of the intermediate-frequency pulses applied to said input inductance, a pulse counting device coupled to said output resistor to produce an output voltage varying in amplitude in accordance with the periodicity of the demodulated pulses applied thereto, and means to apply the voltage developed across said network as an automatic gain control voltage to said mixer circuit and said intermediate and radio frequency amplifiers.

HERRE RINIA.

REFERENCES CITED

The following references are of record in the file of this patent:

UNITED STATES PATENTS

| Number | Name | Date |
|---|---|---|
| 2,259,520 | Freeman | Oct. 21, 1941 |
| 2,262,838 | Deloraine et al. | Nov. 18, 1941 |
| 2,266,401 | Reeves | Dec. 16, 1941 |
| 2,282,092 | Roberts | May 5, 1942 |
| 2,428,011 | Chatterjea et al. | Sept. 30, 1947 |
| 2,450,443 | Rich | Oct. 5, 1948 |

FOREIGN PATENTS

| Number | Country | Date |
|---|---|---|
| 558,343 | Great Britain | Dec. 31, 1943 |